United States Patent
Gunnarsson et al.

(10) Patent No.: US 12,028,313 B2
(45) Date of Patent: Jul. 2, 2024

(54) CAPABILITY BASED GENERIC AGENT

(71) Applicant: MEN & MICE, Kopavogur (IS)

(72) Inventors: Magnus Gunnarsson, Kopavogur (IS); Alexander Elis Ebenesersson, Kopavogur (IS); Ester Anna Palsdottir, Kopavogur (IS); Baldur Por Haraldsson, Kopavogur (IS); Arnar Bjarni Arnarson, Kopavogur (IS); Matthias Asgeirsson, Kopavogur (IS); Konrad Vidar Erlendsson, Kopavogur (IS)

(73) Assignee: MEN & MICE, Kopavogur (IS)

( * ) Notice: Subject to any disclaimer, the term of this patent is extended or adjusted under 35 U.S.C. 154(b) by 0 days.

(21) Appl. No.: 18/321,273

(22) Filed: May 22, 2023

(65) Prior Publication Data

US 2023/0379296 A1 Nov. 23, 2023

Related U.S. Application Data (60) Provisional application No. 63/344,225, filed on May 20, 2022.

(51) Int. Cl.
*G06F 15/173* (2006.01)
*G06F 9/54* (2006.01)
*H04L 61/4511* (2022.01)

(52) U.S. Cl.
CPC .......... *H04L 61/4511* (2022.05); *G06F 9/547* (2013.01)

(58) Field of Classification Search
CPC .............................. H04L 61/4511; G06F 9/547

(Continued)

(56) References Cited

U.S. PATENT DOCUMENTS

2006/0026272 A1\* 2/2006 Sullivan ................ H04L 67/565
709/246
2010/0174811 A1\* 7/2010 Musiri ................ H04L 63/0272
709/223

(Continued)

FOREIGN PATENT DOCUMENTS

| CN | 103929507 A | \* | 7/2014 |
| CN | 106533729 A | | 3/2017 |

(Continued)

OTHER PUBLICATIONS

Mcintosh Colin et al., "Simple streaming telemetry. Introducing gnmi-gateway", Nov. 23, 2020, pp. 1-18.

(Continued)

*Primary Examiner* — Liang Che A Wang
(74) *Attorney, Agent, or Firm* — Workman Nydegger (57) ABSTRACT

Systems and methods for managing DNS services include a DNS management module defining a user interface, at least one generic DNS agent receiving a management command from the user interface of the DNS management module, and at least one external DNS server receiving a request from the at least one generic DNS agent corresponding to the management command, the at least one generic DNS agent implementing a capability-based API to define service specific operations of the at least one external DNS server. The management command may include an API call corresponding to a generic capability or a service specific operation defined in the capability-based API, and the capability-based API may include a gRPC API.

18 Claims, 7 Drawing Sheets

(58) Field of Classification Search
USPC .................................................. 709/223, 224
See application file for complete search history.

(56) References Cited

U.S. PATENT DOCUMENTS

2020/0314065 A1* 10/2020 Roy ..................... H04L 63/0209
2021/0258350 A1*  8/2021 Buck .................... H04L 61/4511
2022/0368769 A1* 11/2022 Mizuno ................. H04L 67/562

FOREIGN PATENT DOCUMENTS

CN          111181727 A  *  5/2020   ......... H04L 63/0807
CN          114124890 A  *  3/2022

OTHER PUBLICATIONS

Shakir A Shaikh P Borman M Hines C Lebsack C Morrow Google R, "gRPC Network Management Interface (gNMI) draft-openconfig-rtgwg-gnmi-spec-01; draft-openconfig-rtgwg-gnmi-spec-01.txt", gRPC Network Management Interface (gNMI) draft-openconfig-rtgwg-gnmi-spec-01; draft-openconfig-rtgwg-gnmi-spec-01.txt; Internet-Draft: Network Working Group, Internet Engineering Task Force, IETF; STA, No. 1, Mar. 5, 2018, pp. 1-9.

Shakir A Shaikh P Borman M Hines C Lebsack C Morrow Google R: "gRPC Network Management Interface (gNMI); draft-openconfig-rtgwg-gnmi-spec-00.txt", gRPC Network Management Interface (gNMI); draft-openconfig-rtgwg-gnmi-spec-00.txt, Internet Engineering Task Force, IETF; Standardworkingdraft, Internet Society (ISOC) 4, Rue Des Falaises CH-1205 Mar. 13, 2017, pp. 1-37.

Anonymous: "DNS management software—Wikipedia" Nov. 22, 2021, pp. 1-3.

International Search Report from corresponding PCT Application No. PCT/IB2023/055252, Jul. 25, 2023.

* cited by examiner

CAPABILITY BASED GENERIC AGENT

TECHNICAL FIELD

Embodiments of the disclosure relate generally to network communication and communication system implementations. In particular, systems, computer program products, and methods are disclosed for configuring a network based on a domain name system (DNS) policy using at least one generic DNS agent implementing a capability-based application programming interface (API).

BACKGROUND

The domain name system (DNS) provides an essential mapping of readable and recognizable domain names to numeric Internet Protocol (IP) addresses for the modern internet. As a dramatic rise in the digitization of work, social interaction, information, and entertainment has led most of the world's population to regular use of the internet, DNS has evolved into a complex and intricate protocol. The DNS is the internees phonebook, allowing users to connect to online services through user-friendly domain names in place of IP addresses. Organizations across the internet run DNS nameservers, which use DNS configurations called zone files to determine how to handle each query, either returning an IP address, rewriting the query to another query, or delegating the responsibility to another nameserver.

Though modern DNS has been somewhat standardized through the publication of Request for Comments (RFC) memoranda by the Internet Engineering Task Force (IEFT), many RFCs are informational or experimental in nature rather than being widely adopted standards, and each DNS service inevitably offers their own unique set of non-standard features, e.g., custom DNS records, zone types, or operations. Bugs in DNS implementations can lead to incorrect or implementation-dependent behavior, security vulnerabilities, and more, while even standardized DNS features may also utilize vastly different interfaces between DNS services.

With continuing revisions and the addition of new features into the DNS, it has become challenging to maintain an efficient, high-throughput, multithreaded implementation that is also bug-free and compliant with the DNS RFC specifications. As a result, nameserver implementations frequently suffer from incorrect or implementation-specific behavior that causes outages, security vulnerabilities, and more. This poses significant problems when trying to offer a common interface for getting DNS data from and for making DNS changes to a plurality of different DNS providers.

At the same time, multi-DNS architecture, multi-cloud networks, hybrid networks and related multi-service implementations offer increasing advantages to users over the use of only one or a small number of providers. However, existing attempts at solving the challenges presented by the variations in different external DNS services entail enormous effort and cost, requiring more coding changes spread out over multiple components, such that end users may be limited to the use of only a small number of DNS providers. Accordingly, the possibility of achieving increased security, greater reliability and the ability to tune a network to the specific needs of a particular user by selecting individual features from many different providers remains a mostly theoretical ideal.

The ability to offer a common interface capable of managing both common operations as well as specific operations for each DNS service provider thus remains limited. There is therefore a need to overcome or ameliorate at least one of the problems of the prior art. In particular, there is a need for a common interface that is capable of managing both common operations as well as specific operations for each DNS service provider without significant increases in effort, cost and processing delays.

SUMMARY

In one aspect, embodiments of the current disclosure provide a system for managing DNS services. The systems may include a DNS management module defining a user interface, at least one generic DNS agent configured to receive a management command from the user interface of the DNS management module, and at least one external DNS server configured to receive a request from the at least one generic DNS agent corresponding to the management command. The at least one generic DNS agent may be configured to implement a capability-based API to define service specific operations of the at least one external DNS server.

In varying embodiments, a capability-based API may be a Google Remote Procedure Call (gRPC) API and the management command may comprise an API call corresponding to a generic capability or a service specific operation defined in the capability-based API.

According to another aspect, the embodiments include a method for managing DNS services. The method may include defining a user interface at a DNS management module, transmitting a management command from the user interface of the DNS management module to at least one generic DNS agent, and transmitting a request corresponding to the management command from the at least one generic DNS agent to at least one external DNS server for obtaining or changing DNS features at the at least one external DNS server. The method may further include implementing a capability-based API to define service specific operations of the at least one external DNS server at the at least one generic DNS agent.

In an embodiment, the at least one generic DNS agent may send the request to the at least one external DNS server using a communication protocol corresponding to a protocol of the at least one external DNS server.

The DNS management module may query the at least one generic DNS agent for generic capabilities and/or service specific operations offered by the at least one external DNS server, the generic capabilities and/or service specific operations including the generic capability or the service specific operation defined in the capability-based API, while the at least one generic DNS agent may provide the DNS management module with schemas corresponding to the generic capability or the service specific operation defined in the capability-based API.

A non-transitory hardware storage device is also provided having stored thereon computer executable instructions which, when executed by one or more processors of a computer, configure the computer define a capability-based API and/or manage one or more external DNS servers by requesting DNS data or modifying DNS properties of the one or more external DNS servers.

Preferred embodiments of a system and method for managing DNS services advantageously utilize a novel architecture that leverages a capability-based API, in embodiments at least one external DNS server, in combination with specially adapted generic DNS agents to define service specific operations of the at least one external DNS server for a DNS management module. The DNS management module may comprise a user interface configured to present available operations of the at least one external DNS server to a user in a uniform manner. The system and method of these or other disclosed embodiments may allow for the use of both common DNS operations as well as service specific operations at the at least one external DNS server. Using the generic DNS agent in conjunction with implementation of the capability-based API, the system and method may allow automatic and/or real-time management of DNS services.

BRIEF DESCRIPTION OF THE DRAWINGS

These and other features, aspects, and advantages of the present disclosure will become better understood regarding the following description, appended claims, and accompanying drawings.

DETAILED DESCRIPTION

Overview

A better understanding of different embodiments of the disclosure may be had from the following description read with the accompanying drawings in which like reference characters refer to like elements.

While the disclosure is susceptible to various modifications and alternative constructions, certain illustrative embodiments are in the drawings and are described below. It should be understood, however, there is no intention to limit the disclosure to the specific embodiments disclosed, but on the contrary, the intention covers all modifications, alternative constructions, combinations, and equivalents falling within the spirit and scope of the disclosure.

It will be understood that unless a term is expressly defined in this application to possess a described meaning, there is no intent to limit the meaning of such term, either expressly or indirectly, beyond its plain or ordinary meaning. For the purposes of this application, a glossary of terms and acronyms is provided at the end of the disclosure.

Various Embodiments and Components for Use Therewith

Various embodiments of the disclosure can be implemented in numerous ways, including as a process; a method; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes and methods may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
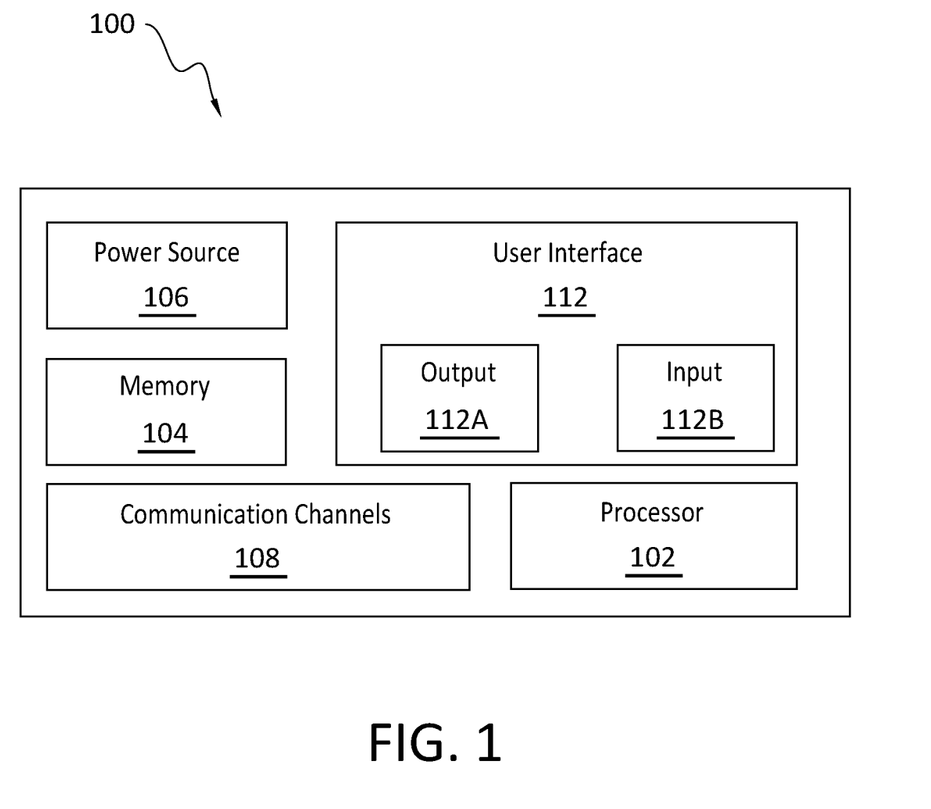
FIG. 1 is a diagram of a computer system for use in a system and a method for managing DNS services according to embodiments of the disclosure.

As illustrated in FIG. 1, in its most basic configuration, a computing system 100 typically includes at least one hardware processing unit 102, memory 104 and a power source 106. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 may include an executable component. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the executable component may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, a network.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

In a typical distributed network computing system, a processor may execute computer-executable instructions and read data from storage medium. Ranked by the efficiency of reading data, fetching data from local RAM is fastest, followed by local disk and then shipping data across network. Ranked by the scarcity and cost of storage medium, local RAM is limited, expensive and under high usage contention, local disk comes next, and remote storage is ample and hence ideal for a program to store data across network. Given the aforementioned Scarcity vs. Execution Burden Factor matrix, a more optimized program operated in the aforementioned network computing system should minimize the data movement across network when possible and if not, spill data to remote disks to leverage faster storage medium remotely.

Those skilled in the art will appreciate that the disclosed embodiments may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The embodiments may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the embodiments may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

A DNS policy can include rules, objects, and/or sets of Internet Protocol (IP) addresses (e.g., an object can be configured/specified to include a set of IP addresses) based on Fully Qualified Domain Names (FQDNs), DNS zones, DNS subzones, and/or DNS wildcards. The DNS policy can be applied by a DNS server/appliance for a network to implement/enhance the DNS policy for network control based on DNS-related information provided by the DNS server (e.g., based on DNS records, updates and/or associated metadata information maintained by the DNS server).

A DNS server that is a source of authoritative DNS information generally has access to authoritative network information regarding the existence of an endpoint (e.g., a device) on a network, IP address changes, and/or other network information (e.g., as provided by a DNS server for the network that is authoritative, or a DNS server for the network that is passive such that it is also aware of such network information through recursive DNS information). In an example of a DNS policy, the DNS policy can include rules and/or objects for filtering or firewall rules for the network (e.g., implemented by security devices on the network) and/or Access Control Lists (ACLs) for routing for the network (e.g., implemented by routers or switches on the network). In some cases, the DNS policy can be for controlling access to an endpoint (e.g., an SDN/OpenFlow policy to allow access to the endpoint(s) on an SDN/OpenFlow network) or defining specific network configuration data to be used by an endpoint to connect to a network.

Example use cases for applying the disclosed DNS policies for network control include network configuration, enhanced network services, and/or security policy configuration and/or services. For example, the disclosed techniques for DNS policy for network control can be applied to automatically configure network devices on an enterprise network based on DNS changes, DNS or network information associated with metadata changes, and/or other changes associated with IP addresses or ranges of IP addresses.

In managing DNS services, hard coded interfaces have been found to be too restrictive and inflexible to adapt to the frequent changes and modifications occurring in DNS architecture and related operations. Even if such a hard coded interface could be configured to incorporate updates for a given DNS service or provider, the large and increasing number of available DNS services and providers makes such an implementation impractical due to its size and complexity, requiring users to learn how to code or otherwise implement multiple service-specific functionalities. Because of these challenges, users attempting to implement a common interface for managing multiple DNS services face the drawbacks of increased effort, cost, and potential for error, such as due to the manual efforts required in coding across varying service-specific functionalities.

In view of the foregoing, there is a need for a system and method for managing DNS services with a common interface that addresses the problems and shortcomings of existing approaches. Embodiments of the system and method for managing DNS services according to the present disclosure advantageously overcome the deficiencies of existing approaches, which are limited in functionality and require tremendous time and effort to carry out.

Figure 2:
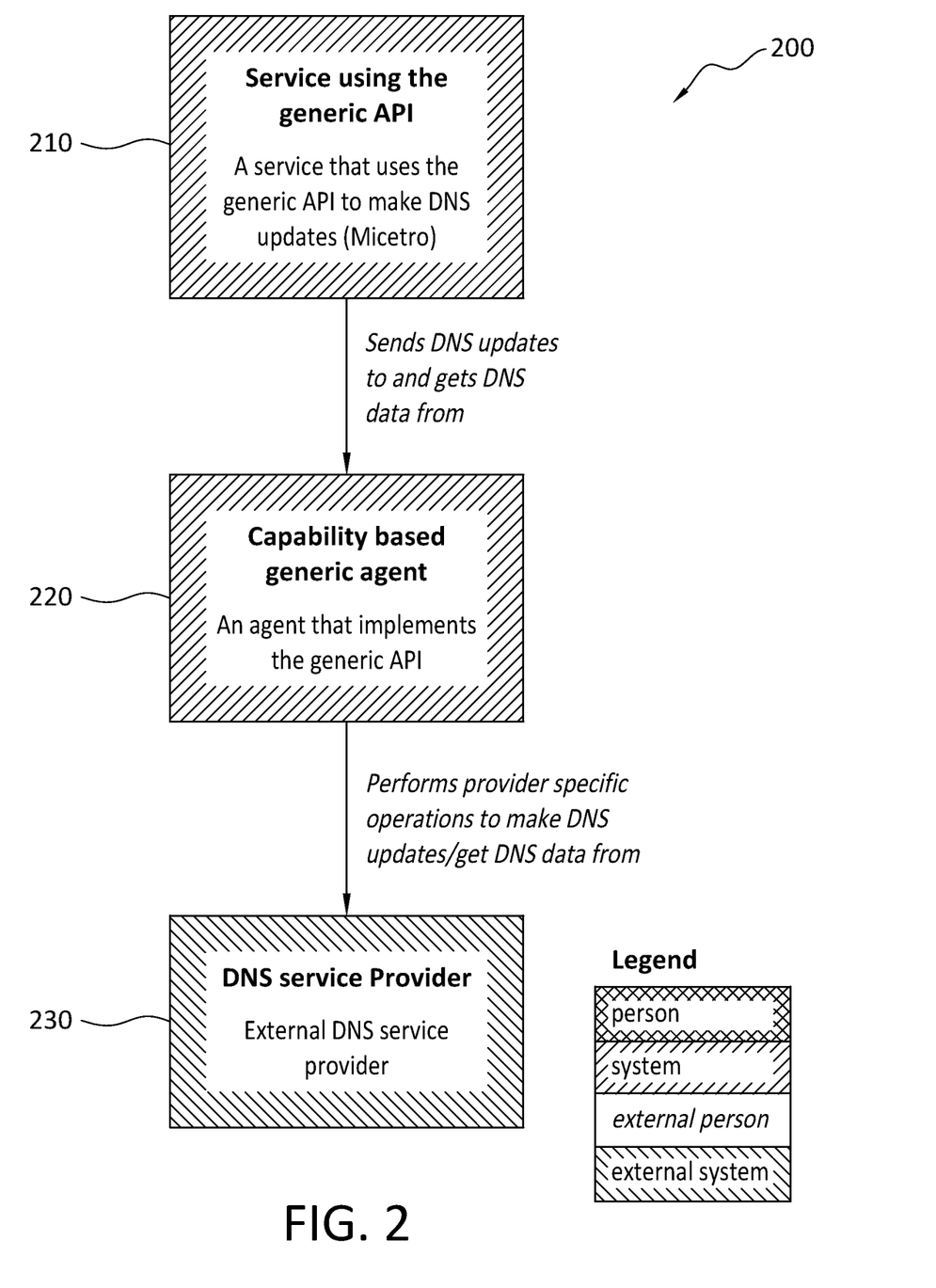
FIG. 2 is a diagram of a system for managing DNS services according to an embodiment of the disclosure.

Referring to FIG. 2, a diagram is shown of a non-limiting network environment or system 200 in which various aspects of the disclosure may be implemented, including a DNS management module 210, at least one generic DNS agent 220, and at least one external DNS server 230. The DNS management module 210, the at least one generic DNS agent 220, and the at least one external DNS server 230 communicate via one or more networks as described above. The networks may be configured in any combination of wired and wireless networks and may include one or more of the following: a direct or indirect physical communication connection, mobile communication network, Internet, intranet, Local Area Network (LAN), Wide Area Network (WAN), Storage Area Network (SAN), and any other form of connecting two or more systems or storage devices together.

The DNS management module 210, the at least one generic DNS agent 220, and the at least one external DNS server 230 may each comprise individually or together a computing system of any type, including a virtual machine or a server such as, for example: a file server; a thin client; an application server; a web server; a proxy server; an appliance; a network appliance; a gateway; an application gateway; a gateway server; a virtualization server; a deployment server; a web server; etc. As would be apparent to one of ordinary skill in the art, the network or system 200 can include various other network devices, including virtual and/or physical servers/appliances as well as physical, virtual, and/or software-defined networking (SDN) devices, and/or client devices. For example, network devices can include various routers, switches, firewalls/security devices, load balancers, and/or other network devices that can implement network control based on a DNS policy.

According to an aspect of the disclosure, the DNS management module 210 may define a user interface for facilitating user input in the form of management commands. Such management commands may correspond to any DNS capabilities of the at least one external DNS server 230, including common operations as well as service specific operations for each service, such as custom DNS records, zone types or other operations. Communication of the management commands is advantageously realized by defining a capability-based API that is implemented by the at least one generic DNS agent 220 to define service specific operations of the at least one external DNS server 230.

In some embodiments, the DNS management module 210 may be configured to query the at least one generic DNS agent 220 for generic capabilities, service specific operations and/or DNS data offered by the at least one external DNS server 230. For example, the at least one generic DNS agent 220 may indicate that an external DNS server 230 includes options allowing the user to change the DNS notify settings, while another external DNS server 230 may not include this functionality in their service.

The at least one generic DNS agent 220 may also define schemas for objects, such as DNS zones and/or records, that may be unique to an external DNS server 230. The schemas may comprise key value structures and resources that each generic DNS agent 220 defines, the schemas describing the data contained in different DNS objects together with descriptions of how these objects and operations should be represented in the user interface. In contrast to conventional systems and methods for managing DNS services, at least by the generic DNS agent 220 defining the schemas according to the disclosed embodiments, there is advantageously no need to implement new user interface functionalities or corresponding coding work for each new service supported.

According to the current disclosure, a user (e.g., network/cloud admin) can view DNS objects and their associated data through a graphical user interface (GUI) at the DNS management module 210. In an example implementation, a user (e.g., network/cloud admin) can view DNS objects and their associated data through a DNS or DDI manager application. Example DNS objects may include a network view, IPv4/IPv6 network container, IPv4/IPv6 network, IPv4/IPv6 DHCP range, IPv4/IPv6 fixed address, DNS view, DNS zone, host record, DNS resource record (e.g., DNS A, PTR, CNAME, etc.), grid member, grid, and extensible attribute.

In certain aspects, the capability-based API may comprise a gRPC API. In gRPC, the DNS management module 210 can directly call methods on the generic DNS agent 220 on a different machine as if it was a local object. gRPC defines a service or capability, and specifies scripts to remotely call services or capabilities with their corresponding parameters and return types.

The gRPC API may be configured to provide an implementation agnostic mechanism for managing DNS configurations and data. gRPC clients, agents and servers can run and communicate with each other in a variety of environments and can be written in any of gRPC's supported languages. For example, a gRPC server can be created in Java and clients can be written in Go, Python, Ruby, or other languages. This means that the language and/or development tools that are best supported for a given DNS service may be used when implementing the generic DNS agents, leading to faster and improved development. The generic DNS agents may be configured to communicate with external DNS servers or services using protocols and/or communication methods as would be apparent to one skilled in the art from the current disclosure, for example including HTTP REST, gRPC, C++ SDK, Microsoft RPC, filesystem operations for reading and writing to files, custom protocols over TCP, and others.

By default, gRPC uses protocol buffers (protobufs), an open-source mechanism for serializing structured data (although it can be used with other data formats such as JSON). When working with protocol buffers, a structure is defined for the data to serialize in a proto file, which is an ordinary text file with a .proto extension. Protocol buffer data is structured as messages, where a message is a small logical record of information containing a series of name-value pairs called fields.

Figure 3:
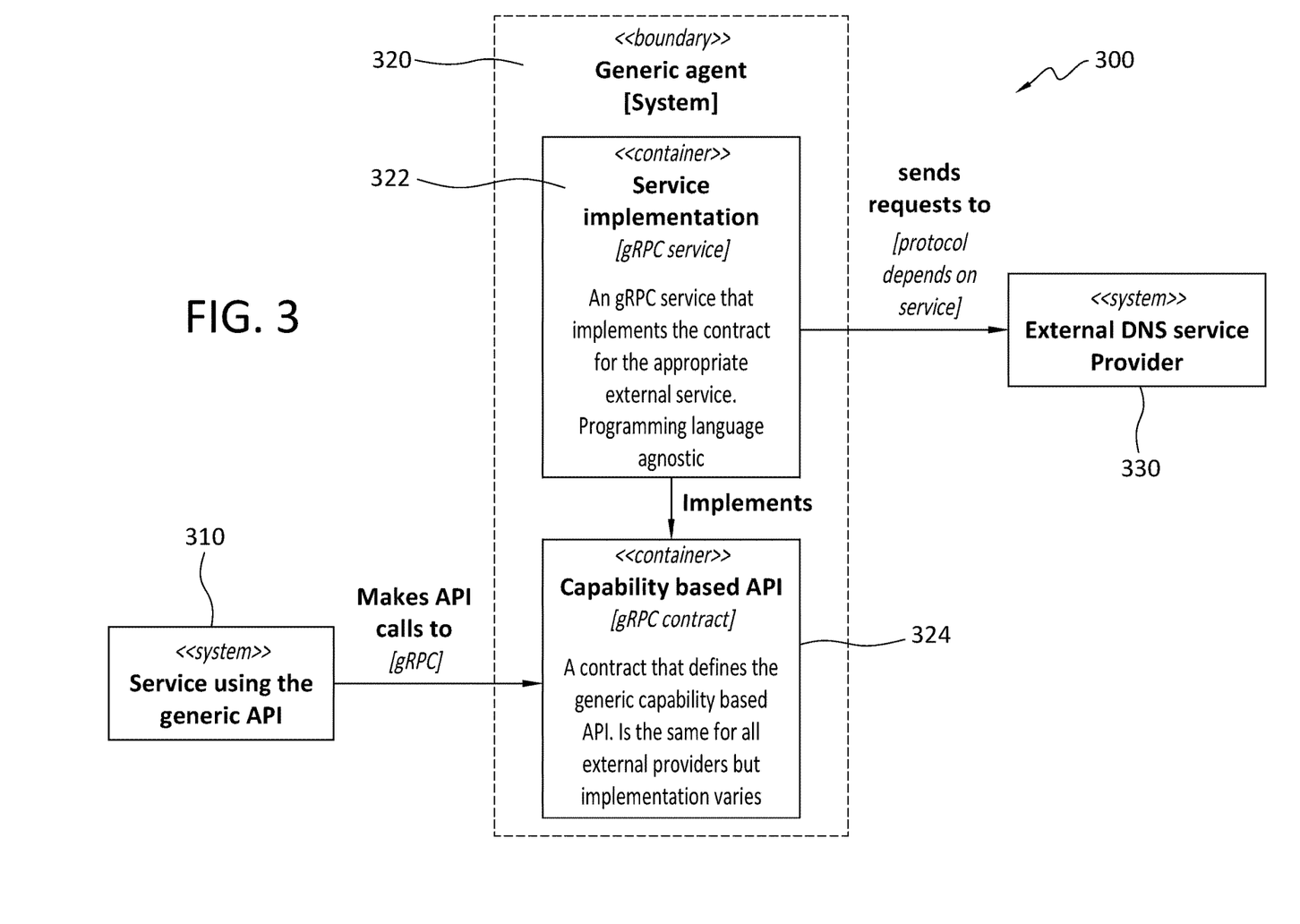
FIG. 3 is a diagram of a system for managing DNS services according to another embodiment of the disclosure.

Turning to FIG. 3, a diagram is shown of a non-limiting network environment or system 300 including a DNS management module 310, at least one generic DNS agent 320, and at least one external DNS server 330. As illustrated in FIG. 3, a system architecture of the generic DNS agent 320 may include a service implementation container 322 and a capability-based API container 324. Through the capability-based API, the DNS command module 310 may make API calls to the generic DNS agent 320 using the gRPC API.

The capability-based API container 324 may comprise a gRPC contract that defines the generic capability-based API in which the same API is utilized for all external DNS servers 330 although specific implementation varies based on the actual capabilities of the external DNS servers 330. The service implementation container 322 may comprise a gRPC service that implements the contract from the capability-based API container 324 for the corresponding external DNS server 330. Consequently, the capability-based API may act as an abstraction layer for a plurality of external DNS server 330 capabilities. By raising the abstraction level using the capability-based API according to features of the current disclosure, the system provides a common interface that is more stand-alone and extensible that conventional interfaces.

As noted previously, the capability-based API is advantageously programming language agnostic. Accordingly, the generic DNS agent 320 may send a request corresponding to the management command to the external DNS server 330 using a protocol corresponding to the external DNS server 330 itself. According to an aspect of the disclosure, the system may include a plurality of generic DNS agents 320 and/or a plurality of external DNS servers 330. In some embodiments, a generic DNS agent 320 may be provided for each external DNS server 330 or DNS service, while other embodiments include a generic DNS agent 320 that may implement support for multiple DNS services.

The implementation by the generic DNS agent 320 has full control over defining the different DNS capabilities of the external DNS server 330 and each agent implementation can use the capability-based API to define non-standard service-specific DNS zones, records, and/or operations which may then be implemented only in the generic DNS agent 320 corresponding to or responsible for that external DNS server 330. This is done by the generic DNS agent 320 exposing API commands used to query what capabilities a certain service or external DNS server 330 offers. When implementing the generic DNS agent 320, a capability service must be defined to respond to queries about the service capabilities. Using this API, queries can be made to determine what operations that service supports, what record types the service supports, what properties are included with zones on that provider, and so on.

Although the generic DNS agents 320 for different external DNS servers 330 or DNS services may have varying implementations, the DNS management module 310 can communicate with all of the plurality of generic DNS agents 320. Advantageously, this allows the DNS management module 310 to query the capabilities of respective external DNS servers 330 from each of the generic DNS agents 320 to provide a user with a clear understanding of what operations are available for each external DNS server 330 and what data is included in the DNS objects of each external DNS server 330. In this manner, the generic DNS agents 320 may advantageously act as an intermediate between a user and/or DNS management module 310 and a plurality of external service providers and/or external DNS servers 330, where each of the plurality of service providers may not only offer different services but also require the use of several different communication protocols. The generic DNS agents 320 may essentially translate a capability-based API call to a protocol, SDK, and/or API of the external service providers, such that there is no limit on the number of external services that may be implemented for a DNS management module 310 of a user.

As would be evident to one skilled in the art from the disclosed embodiments, a generic DNS agent implementing a capability-based API as described in the present application can be used to perform all common DNS operations as well as operations that are specific or unique to one or multiple external DNS servers or services. An end user may therefore use the generic DNS agent implementing the capability-based API to provide both a familiar interface for common DNS operations and also a service-specific interface for custom DNS functionalities offered by the external DNS server.

Figure 4:
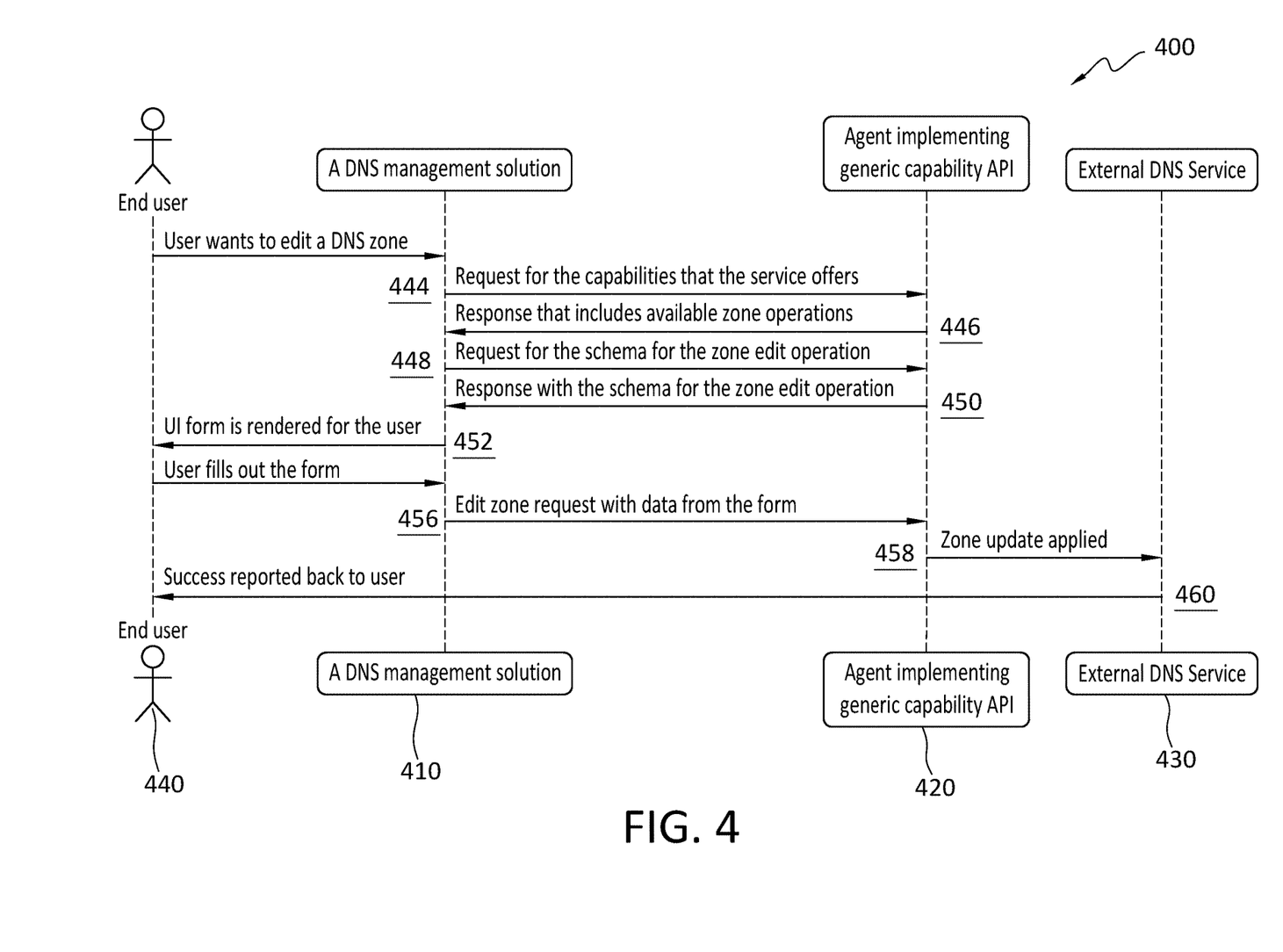
FIG. 4 is a process flow diagram of a method for managing DNS services according to another embodiment of the disclosure.

FIG. 4 illustrates a process flow diagram of an example according to an embodiment of a system and a method 400 according to the current disclosure, where a user 440 edits a DNS zone of an external DNS server 430 using a DNS management module 410 that takes advantage of the generic DNS agent 420 implementing the capability-based API.

In a first aspect, the method 400 may comprise the user accessing 442 the DNS management module 410, such as by a user interface. The user 440 may request to edit a DNS zone or otherwise request an indication of the capabilities offered by the external DNS server 430. The method may comprise the DNS management module 410 requesting 444 the capabilities that the external DNS server 430 offers, such as by sending a query to the generic DNS agent 420 implementing the capability-based API and corresponding to the external DNS server 430.

At step 446 the generic DNS agent 420 may provide a response to the request 444, the response 446 including available zone operations or other indication of the capabilities offered by the external DNS server 430. The DNS management module 410 may then request 448 the schema for the zone edit operation and the generic DNS agent 420 may respond with the requested schema.

The method 400 may also include the DNS management module 410 rendering 452 a user interface based on the schema provided by the generic DNS agent 420. As discussed previously, the user interface and the DNS management module 410 are not required to be hard coded for providing the desired rendering, such as a rendering of a form corresponding to a desired operation. Rather, according to various embodiments, the generic DNS agent 420 provides the schema defining the rendering for the user interface and/or including corresponding system resources. The user 440 may fill out the form at 454 with data corresponding to a desired capability to be performed at the external DNS server 430, the DNS management module 410 editing the zone request with data from the form and the generic DNS agent 420 applying 458 the zone update at the external DNS server 430. A result, such as an indication of a successful result, may be reported back to the user by the external DNS server 430, the generic DNS agent 420 and the DNS management module 410.

According to an advantage of the disclosed system and method, the DNS management module 410 is not relied on to be a single, all-encompassing common interface for all possible external DNS services. Such an adaptation would require restricting the DNS management module to only capabilities common to all external DNS services to avoid system bloat, and would cause the system to lose advantageous capabilities that are limited to only a few or even one external DNS service. Instead, the generic DNS agent of present embodiments is able to implement the capability-based API to define schemas for both common DNS operations as well as those that are service specific.

Similarly, the method and system having features of the current application do not have to implement new APIs for service-specific functionalities. Instead, the capability-based API is adaptable to both differences between and changes within external DNS services, and the generic DNS agents are able to generate definitions of unique features, zone types, record types, and the like by relaying this information from the external DNS servers. At least due to the high abstraction level and the capabilities offered by the capability-based API, support for almost any provider specific feature can be added to the disclosed system and method.

The consolidated DNS management of the disclosed embodiments may provide automatic orchestration across platforms or DNS service providers, removing gaps between live data and documentation. As a consequence, built-in automation may be used to eliminate much of the possibility for human error, and can be augmented with custom scripting that uses just a single API layer for multiple platforms. True cross-platform redundancy and cloud-native integration may further strengthen the resilience of critical DNS infrastructure relative to conventional systems and methods.

Figure 5:
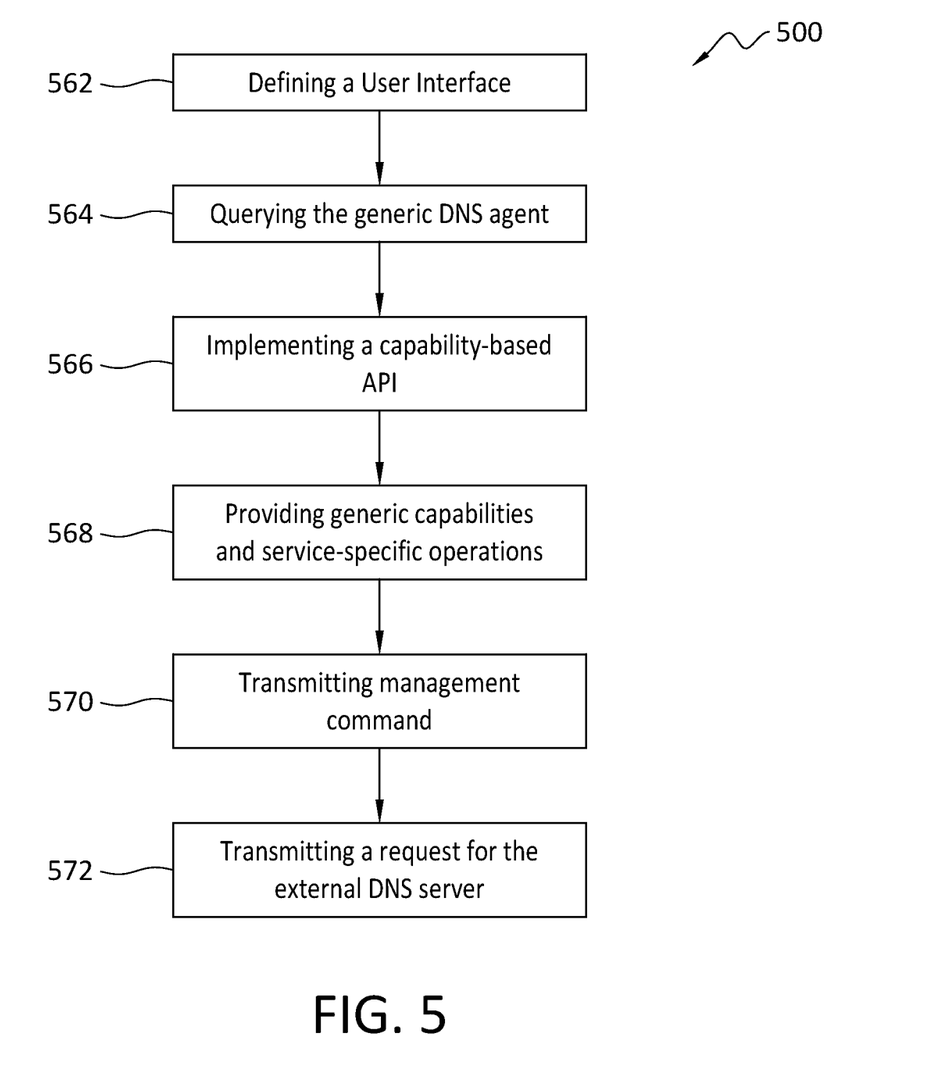
FIG. 5 is a process flow diagram of a method for managing DNS services according to another embodiment of the disclosure.

FIG. 5 is a flow diagram of a method 500 for managing DNS services, comprising defining 562 a user interface at a DNS management module and querying 564 at least one generic DNS agent for generic capabilities and/or service specific operations offered by at least one external DNS server. The at least one generic DNS agent may provide 568 the DNS management module with generic capabilities and/or service specific operations offered by at least one external DNS server, as well as schemas corresponding to the generic capabilities or the service specific operations defined in the capability-based API.

The method may further comprise transmitting 570 a management command from the user interface of the DNS management module to at least one generic DNS agent, and transmitting 572 a request corresponding to the management command from the at least one generic DNS agent to at least one external DNS server, for obtaining or changing DNS features at the at least one external DNS server. The method may further include implementing 566 a capability-based API to define service specific operations of the at least one external DNS server at the at least one generic DNS agent.

Figure 6A:
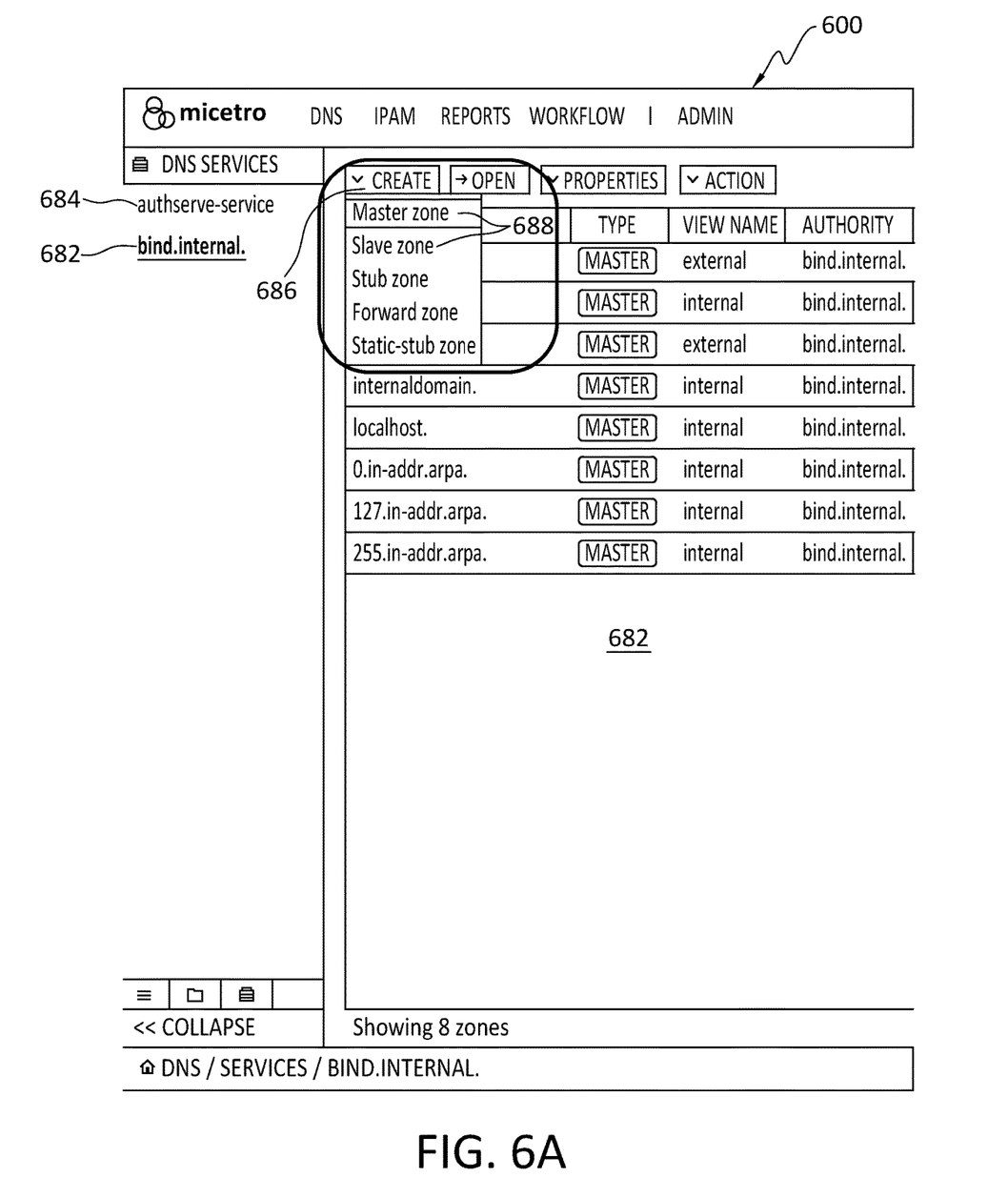
FIG. 6A shows a view of a user interface for managing DNS services according to an embodiment of the disclosure.
Figure 6B:
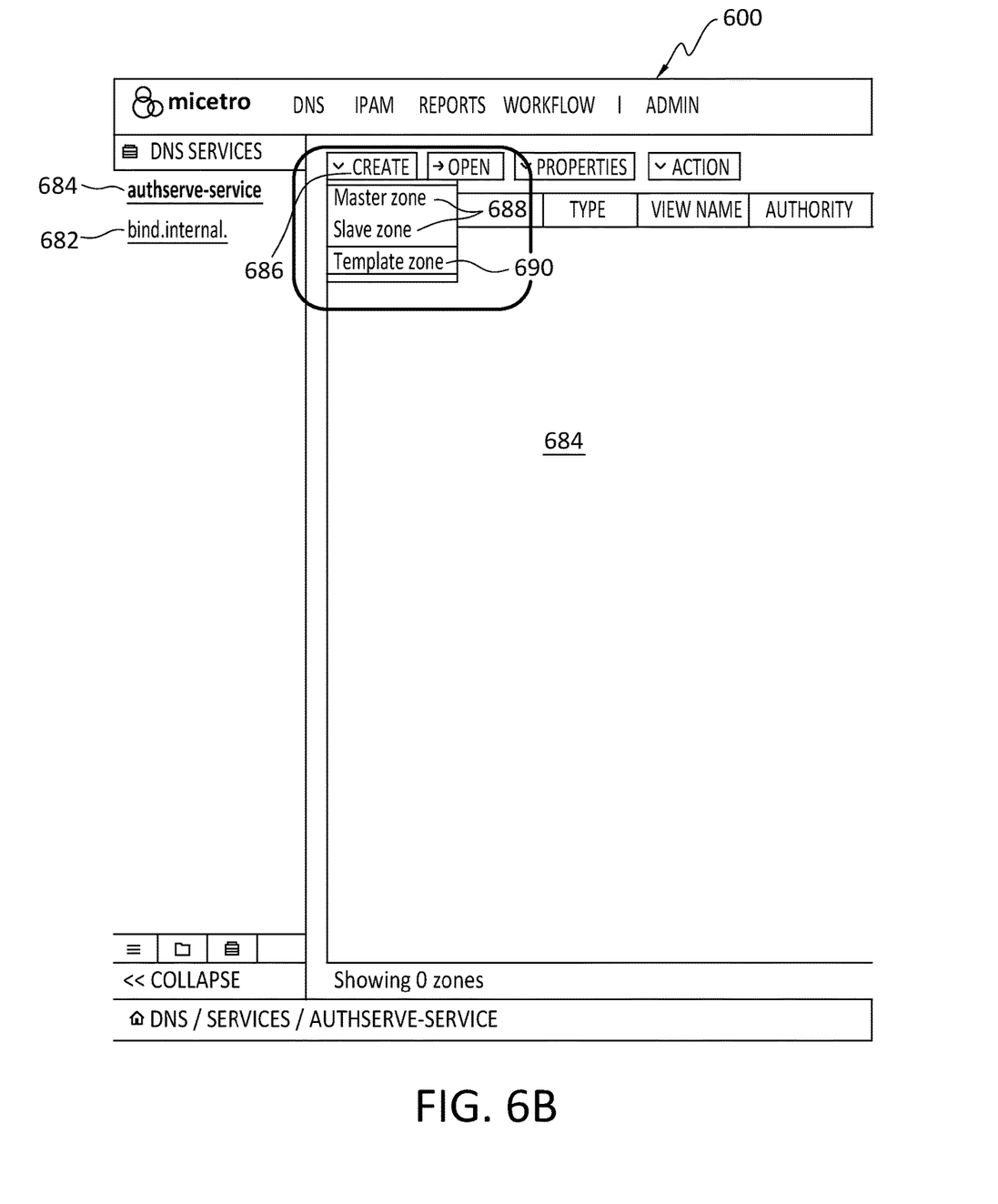
FIG. 6B shows another view of the user interface for managing DNS services according to the embodiment of FIG. 6A.

In one aspect, a DNS management module may comprise a user interface 600 as shown in FIG. 6A and FIG. 6B. The user interface 600 may be used to control operations of a plurality of external DNS services, such as a BIND DNS service 682 and an Authserve DNS service 684. In the case of each service, the user interface 600 queries at least one generic DNS agent using a capability-based API to determine what operations are available at the respective external DNS service. In the example of FIGS. 6A and 6B, the user interface 600 queries a zone creation capability 686 of each external DNS service at the at least one generic DNS agent by means of the capability-based API.

The at least one generic DNS agent returns both generic capabilities 688 and service specific operations 690 for each of the external DNS services together with the specific schema. As shown in FIG. 6A, the user interface 600 receives the respective schemas, presenting a zone creation 686 for the BIND DNS service 682 including Master zones, Slave zones, Stub zones, Forward zones, and Static-stub zones. FIG. 6B shows the user interface 600 presenting a zone creation 686 for the Authserve DNS service 684 including Master zones, Slave zones, and Template zones. While both external DNS services 682, 684 offer generic operations 688 for the creation of Master and Slave zones, which may be standard DNS zones, each external DNS service 682, 684 also offers distinct or service specific operations 690. From the example of FIGS. 6A and 6B, the BIND DNS service 682 also offers the creation of additional standard zone types, e.g., stub and forward, which the Authserve DNS service 684 does not support. On the other hand, the Authserve DNS service 684 offers the creation of template zones, which may be non-standard 690 DNS zones specific to the Authserve DNS service 684.

Surprisingly, the different external DNS services 682, 684 may be managed at the user interface 600 in a uniform manner with the at least one generic DNS agent implementing the capability-based API of the present disclosure, without significantly increasing the user intervention needed or processing requirements of the system. Each agent implementation can have full control over defining different DNS capabilities of the external DNS services, using the capability-based API to define both standard and non-standard service-specific DNS zones, records and/or operations. Each generic DNS agent may advantageously only implement the service specific features of the service for which it is responsible, enabling a lighter, faster, and more streamlined management. Further, the user interface or API client can advantageously communicate with any generic DNS agent in the same manner as they all implement the same capability-based API, significantly increasing the efficiency of managing multiple external services relative to known alternatives.

In embodiments, standard DNS features may include an A record or the like, an A record comprising a DNS feature/record that has been standardized in RFCs. Generally all external DNS providers that support zone management allow creation A records in DNS zones, since it is a standard DNS feature. Accordingly, standard DNS features according to the instant disclosure may be defined as common features shared between a majority of external DNS providers. Non-standard DNS features may include non-standard record types, such as ALIAS DNS records. Some cloud DNS providers allow the user to manage ALIAS DNS records, which are not a part of the DNS standard and even have differing functionality between service providers and can sometimes be connected to resources that are a part of an individual cloud provider's domain. Similarly, non-standard DNS features may include service specific record properties, such as geolocation for records where the providers allow users to add geolocation data to their records, although that is not a standard DNS feature. Standard and non-standard DNS features according to the present disclosure may further include any or all corresponding features known in the art, such as would be readily understood by one skilled in the art from the teachings of the current application.

According to varying embodiments, a non-transitory hardware storage device is also provided having stored thereon computer executable instructions which, when executed by one or more processors of a computer, configure the computer to define a capability-based API and/or manage one or more external DNS servers by requesting DNS data or modifying DNS properties of the one or more external DNS servers. The computer executable instructions may be provided to perform a method or implement a system of the current disclosure. In some aspect, the computer executable instructions may configure the computer to automatically manage or update DNS services in real-time.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

By providing a system and method for managing DNS services according to disclosed embodiments, the problem of existing hard coded or multi-API approaches being expensive, time consuming, and poorly adapted to the number of and variations between DNS services is addressed. The disclosed embodiments advantageously provide a system and method that provides increased flexibility, speed and consistency in managing DNS services.

Various features of the disclosure may be better understood by reference to specific examples according to the current disclosure, as detailed below. The examples provided are illustrative in nature of a single application of principles according to the disclosure and are not intended to be limiting.

EXAMPLE 1

Example 1 provides an example of a schema that defines data belonging to a DNS zone on a theoretical DNS service provider, as follows:

{
"$schema": "https://json-schema.org/draft/2020-12/schema",
"title": "Zone data",
"type": "object",
"description": "The fields required for a zone on a theoretical DNS service provider",
"default": { },
"properties": {
"type": {
"type": "string",
"description": "The type of the DNS zone",

```
"enum": ["master", "slave", "alias"],
"default": "master"
},
"view": {
"type": "string",
"description": "The view containing the DNS zone."
}
}
}
}
```

EXAMPLE 2

Example 2 provides an example of a schema that defines how a user interface for a DNS zone on a theoretical DNS service provider should look, as follows:

```
{
"label": "Zone",
"elements": [{
"type": "Control",
"scope": "#/properties/type"
},
{
"type": "Control",
"scope": "#/properties/view"
}
]
}
```

Not necessarily all such objects or advantages may be achieved under any embodiment of the disclosure. Those skilled in the art will recognize that the disclosure may be embodied or carried out to achieve or optimize one advantage or group of advantages as taught without achieving other objects or advantages as taught or suggested.

The skilled artisan will recognize the interchangeability of various components and/or steps from different embodiments described. Besides the variations described, other equivalents for each feature can be mixed and matched by one of ordinary skill in this art to construct or use a system or method for managing DNS services under principles of the present disclosure. Therefore, the embodiments described may be adapted to managing both common and service-specific operations of one or multiple DNS services or servers.

Although the system or method for managing DNS services has been disclosed in certain preferred embodiments and examples, it therefore will be understood by those skilled in the art that the present disclosure extends beyond the disclosed embodiments to other alternative embodiments and/or uses of the system or method for managing DNS services and obvious modifications and equivalents. Notably, principles and features of the disclosed embodiments may be extended to support additional services outside of DNS applications, such as for DHCP and/or IPAM services. Accordingly, it is intended that the scope of the present system or method for managing DNS services disclosed should not be limited by the disclosed embodiments described above, but should be determined only by a fair reading of the claims that follow.

What is claimed is:

1. A system for managing DNS services, the system comprising:
a DNS management module defining a user interface;
at least one generic DNS agent configured to receive a management command from the user interface of the DNS management module; and
at least one external DNS server comprising at least one processor configured to receive a request from the at least one generic DNS agent corresponding to the management command;
wherein the at least one generic DNS agent implements a capability-based API to define a generic capability or service specific operations of the at least one external DNS server;
wherein the DNS management module is configured to render the user interface using schemas provided by the generic DNS agent; and wherein the schemas correspond to the service specific operation.

2. The system according to claim 1, wherein the management command comprises an API call corresponding to a generic capability or a service specific operation defined in the capability-based API.

3. The system according to claim 1, wherein the capability-based API is a gRPC API.

4. The system according to claim 1, wherein the at least one generic DNS agent sends the request to the at least one external DNS server using a communication protocol corresponding to a protocol of the at least one external DNS server.

5. The system according to claim 2, wherein the DNS management module is configured to query the at least one generic DNS agent for generic capabilities and/or service specific operations offered by the at least one external DNS server, the generic capabilities and/or service specific operations including the generic capability or the service specific operation defined in the capability-based API.

6. The system according to claim 5, wherein the at least one generic DNS agent provides the DNS management module with the schemas corresponding to the generic capability or the service specific operation defined in the capability-based API.

7. The system according to claim 1, wherein the at least one generic DNS agent comprises a plurality of generic DNS agents and the at least one external DNS server comprises a plurality of external DNS servers.

8. The system according to claim 7, wherein a number of the plurality of external DNS servers is equal to a number of the plurality of generic DNS agents.

9. The system according to claim 1, wherein the generic DNS agent comprises a gRPC contract and a gRPC service.

10. A method for managing DNS services, the method comprising:
defining a user interface at a DNS management module;
implementing a capability-based API to define a generic capability or service specific operations of at least one external DNS server using at least one generic DNS agent, the at least one external DNS server including at least one processor;
transmitting a management command from the user interface of the DNS management module to the at least one generic DNS agent, and
transmitting a request corresponding to the management command from the at least one generic DNS agent to the at least one external DNS server;
wherein the DNS management module is configured to render the user interface using schemas provided by the generic DNS agent; and wherein the schemas correspond to the service specific operation.

11. The method according to claim 10, wherein the management command comprises an API call corresponding to a generic capability or a service specific operation defined in the capability-based API.

12. The method according to claim 10, wherein the capability-based API is a gRPC API.

13. The method according to claim 10, the at least one generic DNS agent sending the request to the at least one external DNS server using a communication protocol corresponding to a protocol of the at least one external DNS server.

14. The method according to claim 11, the DNS management module querying the at least one generic DNS agent for generic capabilities and/or service specific operations offered by the at least one external DNS server, the generic capabilities and/or service specific operations including the generic capability or the service specific operation defined in the capability-based API.

15. The method according to claim 14, the at least one generic DNS agent providing the DNS management module with the schemas corresponding to the generic capability or the service specific operation defined in the capability-based API.

16. The method according to claim 10, wherein the at least one generic DNS agent comprises a plurality of generic DNS agents and the at least one external DNS server comprises a plurality of external DNS servers.

17. The method according to claim 16, wherein a number of the plurality of external DNS servers is equal to a number of the plurality of generic DNS agents.

18. The method according to claim 10, wherein the generic DNS agent comprises a gRPC contract and a gRPC service.

* * * * *